(12) United States Patent
Zhuang et al.

(10) Patent No.: US 9,706,246 B2
(45) Date of Patent: Jul. 11, 2017

(54) CABLE MODEM

(71) Applicant: THOMSON LICENSING, Issy les Moulineaux (FR)

(72) Inventors: Zujian Zhuang, Beijing (CN); Jinfei Yu, Beijing (CN)

( * ) Notice: Subject to any disclaimer, the term of this patent is extended or adjusted under 35 U.S.C. 154(b) by 0 days.

(21) Appl. No.: 14/915,461

(22) PCT Filed: Aug. 29, 2013

(86) PCT No.: PCT/CN2013/082519
§ 371 (c)(1),
(2) Date: Feb. 29, 2016

(87) PCT Pub. No.: WO2015/027418
PCT Pub. Date: Mar. 5, 2015

(65) Prior Publication Data
US 2016/0212473 A1  Jul. 21, 2016

(51) Int. Cl.
| | |
|---|---|
| H04N 7/16 | (2011.01) |
| H04N 21/426 | (2011.01) |
| H04L 12/28 | (2006.01) |
| H04L 29/06 | (2006.01) |
| H04N 7/22 | (2006.01) |
| H04N 21/61 | (2011.01) |

(52) U.S. Cl.
CPC ... *H04N 21/42676* (2013.01); *H04L 12/2801* (2013.01); *H04L 12/2898* (2013.01); *H04L 69/22* (2013.01); *H04N 7/22* (2013.01); *H04N 21/6118* (2013.01); *H04N 21/6168* (2013.01)

(58) Field of Classification Search
CPC ............. H04N 21/239; H04N 21/2385; H04N 21/437; H04N 21/438; H04N 21/2402; H04N 21/6118; H04N 21/64723; H04N 21/60
See application file for complete search history.

(56) References Cited

U.S. PATENT DOCUMENTS

| | | | | |
|---|---|---|---|---|
| 6,223,222 B1 * | 4/2001 | Fijolek | ............... | H04L 12/2801 348/E7.071 |
| 6,230,326 B1 * | 5/2001 | Unger | ............... | H04N 7/17309 348/E7.07 |
| 6,385,207 B1 * | 5/2002 | Woundy | ............... | H04J 3/1694 348/E7.073 |
| 6,791,995 B1 * | 9/2004 | Azenkot | ............... | H04B 1/707 348/E5.008 |
| 8,201,207 B2 | 6/2012 | An et al. | | |
| 8,213,452 B2 | 7/2012 | Hou | | |

(Continued)

FOREIGN PATENT DOCUMENTS

CN          102255719 A         11/2011

OTHER PUBLICATIONS

Extended European Search Report for EP13892456.8, Feb. 23, 2017.

*Primary Examiner* — Pankaj Kumar
*Assistant Examiner* — Timothy Newlin

(57) ABSTRACT

A cable modem for a network is provided. The cable modem comprises: a radio frequency resource manager unit for allocating a radio frequency resource to a plurality of cable modem terminal systems; and an interface manager unit for establishing radio frequency interfaces respectively with the plurality of cable modem terminal systems according to the radio frequency resource allocation of the radio frequency resource manager unit.

11 Claims, 3 Drawing Sheets

(56) References Cited

U.S. PATENT DOCUMENTS

| | | |
|---|---|---|
| 8,335,226 B2 | 12/2012 | Kolze |
| 2002/0023273 A1* | 2/2002 | Song ............... H04N 7/173 |
| | | 725/111 |
| 2002/0136203 A1* | 9/2002 | Liva ............... H04B 10/272 |
| | | 370/352 |
| 2002/0144287 A1* | 10/2002 | Wada ............ H04N 7/17318 |
| | | 725/111 |
| 2003/0058893 A1* | 3/2003 | Dworkin ............ H04J 3/0682 |
| | | 370/503 |
| 2003/0093799 A1* | 5/2003 | Kauffman ............ H04L 29/06 |
| | | 725/86 |
| 2003/0169735 A1* | 9/2003 | Johnson ............ H04L 12/2801 |
| | | 370/392 |
| 2004/0139473 A1* | 7/2004 | Greene ............... H04B 1/74 |
| | | 725/111 |
| 2006/0117363 A1 | 6/2006 | Lee et al. |
| 2007/0206600 A1 | 9/2007 | Klimker et al. |
| 2009/0103557 A1 | 4/2009 | Hong et al. |
| 2011/0138434 A1* | 6/2011 | Ulm ............... H04N 21/238 |
| | | 725/114 |
| 2011/0154424 A1* | 6/2011 | Lee ............... H04L 12/2801 |
| | | 725/110 |
| 2012/0023535 A1 | 1/2012 | Brooks |
| 2012/0110631 A1 | 5/2012 | Rakib |
| 2012/0213259 A1 | 8/2012 | Renken et al. |
| 2012/0291084 A1 | 11/2012 | Rakib |
| 2013/0174186 A1* | 7/2013 | Kelsen ............ H04N 21/2543 |
| | | 725/2 |

\* cited by examiner

CABLE MODEM

This application claims the benefit, under 35 U.S.C. §365 of International Application PCT/CN2013/082519, filed Aug. 29, 2013, which was published in accordance with PCT Article 21(2) on Mar. 5, 2015 in English.

TECHNICAL FIELD

The present invention relates to a cable modem for DOCSIS(Data Over Cable Service Interface Specification) based network.

BACKGROUND

DOCSIS standard permits the addition of high-speed data transfer to an existing cable TV (CATV) system. Many cable television operators apply DOCSIS to provide internet access over their existing hybrid fiber-coaxial (HFC) network infrastructure.

A cable modem (CM) is a type of network device that provides bi-directional data communication via radio frequency channels on the HFC network. The cable modem will work with a cable modem terminal system (CMTS) in the network, which is a headend device of the cable television operator used to forward digital IP packets to and from the cable modem to provide high speed data services to cable subscribers.

Conventionally a cable modem of DOCSIS based network can only work with one CMTS at a certain time. The cable modem will firstly search for the available downstream and upstream channels broadcasted by the CMTS at initialization. After channel locked, the cable modem will complete a ranging phase and an IP initialization phase, then reach agreement with the CMTS on the channel bonding set and service flow contracts. From then on, the cable modem works as layer 2 bridge to forward packets between the cable interface and CPE interface.

FIG. 1 is an exemplary diagram showing a conventional network architecture for DVB live TV distribution. As shown in FIG. 1, a CMTS exchanges IP packets with an IP backbone network over Ethernet cable 101. Downstream RF (Radio Frequency) signals 102 from the CMTS of IP backbone network and a DVB service platform are mixed by a RF mixer. It can be appreciated that the RF mixer is a passive component for mixing the RF signals from various incoming paths to one outgoing path. The mixed RF signal is transmitted to a fiber node over HFC fiber 103, which will exchanges signals with a cable modem over RF cable 104. The fiber node also transmits feedback signals to the CMTS over a HFC fiber 103. The cable modem can exchange data packets with one or more CPEs (Customer Premise Equipments). For example, as shown in FIG. 1, the cable modem can provide bi-directional communications with a PC over Ethernet cable 101 or with a STB (Set-Top-Box) over Ethernet cable 101 or RF cable 104. Feedback signal from the cable modem over cable is converted to a fiber signal at the fiber node and transmitted to the CMTS headend directly over a return path 105. So the bi-directional data communication between CMTS and cable modem actually is splitted into different paths for downstream and upstream respectively.

Currently many chips used in cable modems have full band capability to tune to multiple RF channels at the same time. However, such band capability was not fully used.

SUMMARY

In view of the above problem in the conventional technologies, the invention proposes to take advantages of the full band capability of a cable modem to work with multiple CMTSs at the same time. The full band capture capability of the cable modem is divided to multiple RF channel sets both for upstream and downstream and each RF channel set is dedicated for DOCSIS communication with one CMTS. In this sense, a physical cable modem appears to be multiple virtual cable modems.

According to one aspect of the invention, a cable modem for a network is provided. The cable modem comprises: a radio frequency resource manager unit for allocating a radio frequency resource to a plurality of cable modem terminal systems; and an interface manager unit for establishing radio frequency interfaces respectively with the plurality of cable modem terminal systems according to the radio frequency resource allocation of the radio frequency resource manager unit.

According to one aspect of the invention, a network system is provided. The network system comprises: a service platform for providing IP data and live TV services; a first cable modem terminal system for performing a communication of IP data with the service platform; a second cable modem terminal system for performing a communication of live TV signals with the service platform; and a cable modem for performing communications with the first cable modem terminal system and the second cable modem terminal system with allocated radio frequency resource and providing the IP data and live TV signals to respective Customer Premise Equipments.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DETAILED DESCRIPTION

An embodiment of the present invention will now be described in detail in conjunction with the drawings. In the following description, some detailed descriptions of known functions and configurations may be omitted for conciseness.

Figure 1:
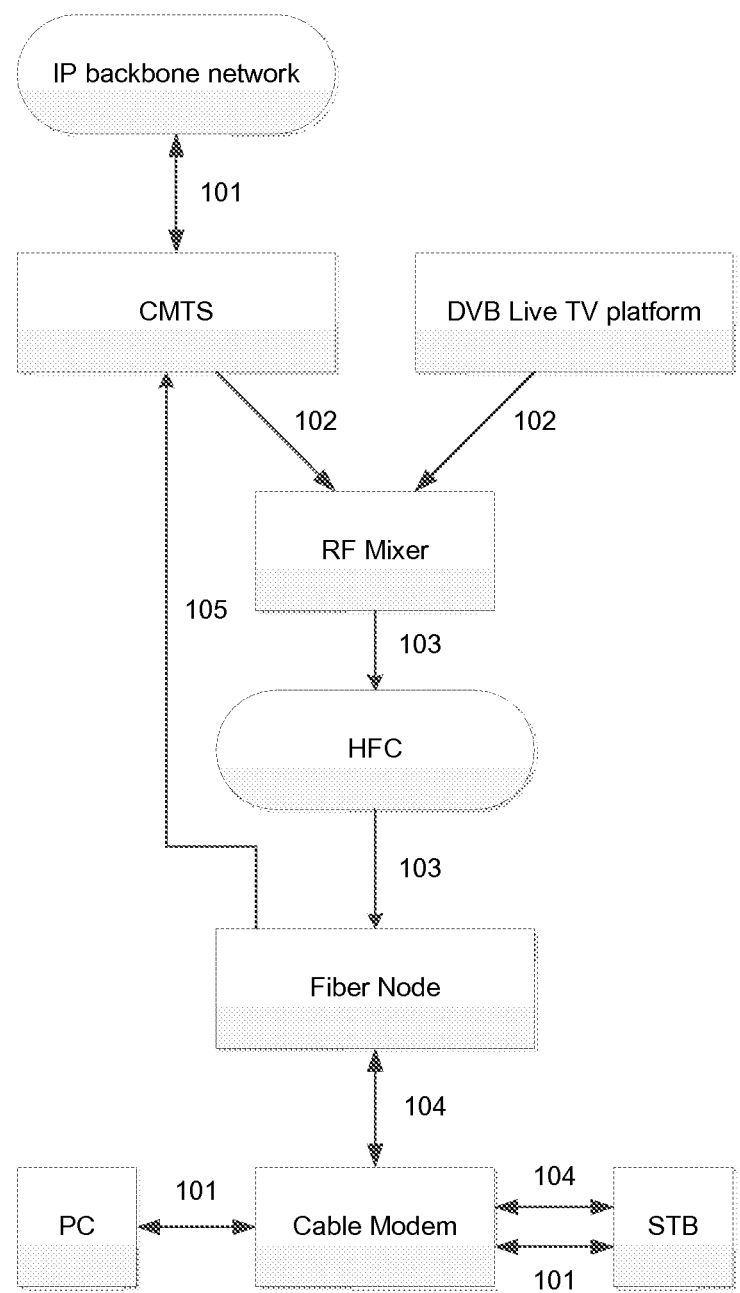
FIG. 1 is an exemplary diagram showing a conventional network architecture for DVB live TV distribution.

In traditional DVB-C network as shown in FIG. 1, live digital TV signals are encapsulated in TS (Transport Stream) format and broadcasted to all STBs by QAM modulation over cable. The digital program stream is secured by CA (Conditional Access) system to prevent service theft.

With the emergence of triple play and convergence of telecom and TV domains, telecom operators are now entering the live TV market by IPTV service and broadband IP connection.

Cable operators also seek to move to full IP solution to embrace triple play era since IP (Internet Protocol) technology is now de-factor the transmission standard for almost all technology areas. In order to reduce operational burden, the full IP solution for both TV, internet and voice service is very attractive for cable operators. However, it is not an optimal option for the cable network to simply adopt the same IPTV technology as telecom. The main reason is that such solution will need the construction of heavy internet infrastructures to carry huge IPTV traffic, which also may result in a waste of the cable bandwidth.

In view of the above disadvantages, a new network architecture is proposed for a cable operator to keep the internet network dedicated for the HSI (high speed internet) service while the cable resource is used for live TV broadcasting. This can also achieve the goal for cable operators to move to IP solution for TV distribution.

Figure 2:
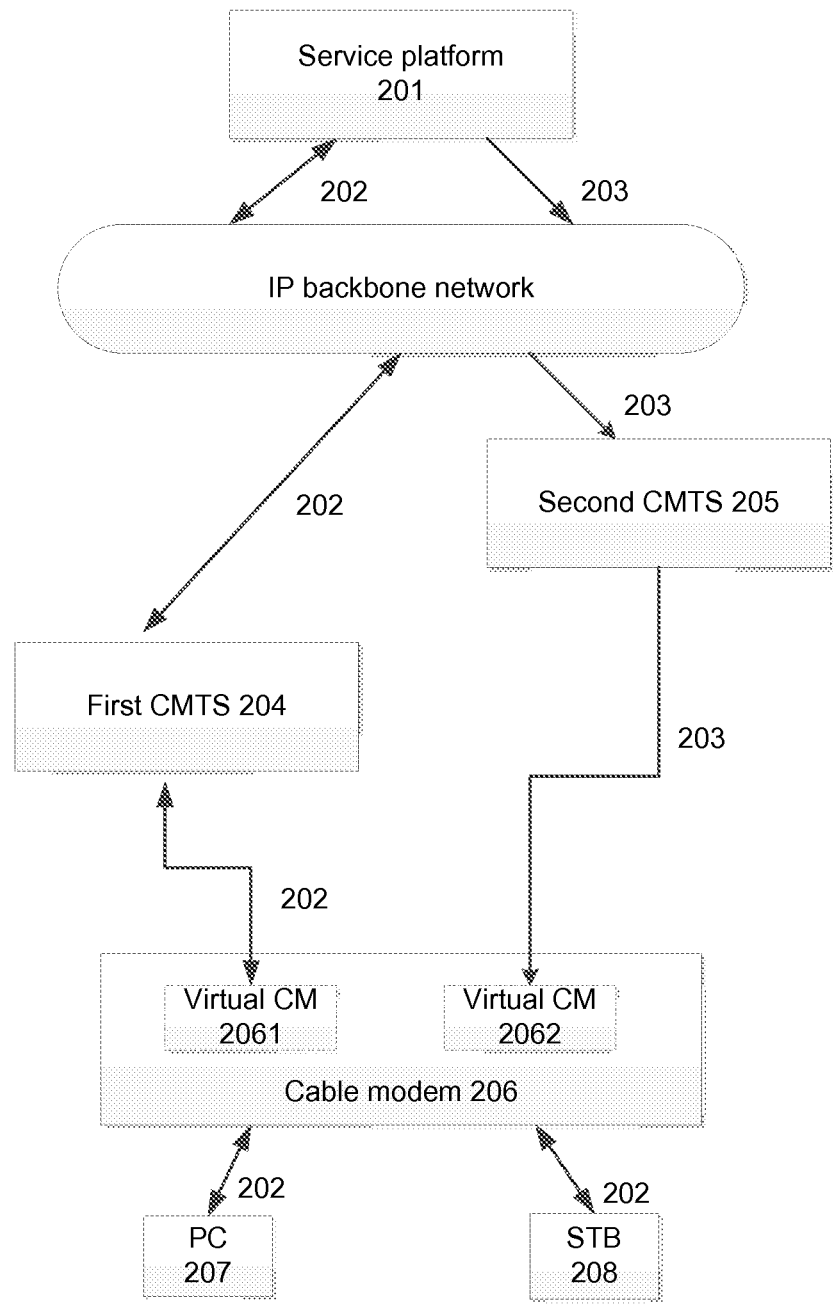
FIG. 2 is an exemplary diagram showing a network architecture for live TV distribution according to an embodiment of the present invention.

FIG. 2 is an exemplary diagram showing a network architecture for live TV distribution according to an embodiment of the present invention.

The system shown in FIG. 2 comprises a service platform 201 to support services to subscribers. According to the specific application context, the service platform 201 may comprises multiple servers for multiple services. In this embodiment, the service platform 201 can provide IP data service via an IP data plane 202 and live TV service via a live TV plane 203.

The service platform 201 can exchange IP data with a first CMTS 204 via a IP backbone network. Traditional IP communication process can be used between the service platform 201 and the first CMTS 204 and no further details will be provided.

With regards to the live TV service, at the service platform 201, a live TV program is encoded into digital format and packets of the single program are encapsulated in UDP/IP format. Then the IP packets for live TV stream are constantly transmitted to a second CMTS 205 via the IP backbone network. It can be appreciated that both unicast and multicast can be used for the transmission. For simplicity , the multicast transmission will be described since the live TV stream must be delivered to a cable modem on cable in multicast way too, with each single program stream occupy one dedicated multicast group address.

At the CMTS 205, the received IP streams of live TV signal are simply forwarded to the cable interface by the same MAC encapsulation as how a normal CMTS delivers downstream broadcast IP packets, with the only difference being that the destination is multicast IP address and the transmitted RF channel is fixed by configuration for each multicast IP address. The CMTS 205 reserves some dedicated Docsis downstream channels but has no need for any other CMTS MAC functionalities. It can just multiplex the received live TV IP streams and modulate them to one or more Docsis downstream RF channels with the same DOCSIS downstream MAC((Media Access Control) format and PHY(Physical Layer) characters. In this embodiment, the Docsis 2.0 downstream MAC format and PHY character is preferred as it does not have Docsis MAC management feature to implement complex Docsis 3.0 features such as channel bonding. So there is no channel bonding requirement for such devices.

IP data from the CMTS 204 and IP packets of live TV from the CMTS 205 are both transmitted to the cable modem 206.

The cable modem 206 has the capability to tune to minimum two Docsis MAC domains at the same time. In this sense, the physical cable modem 206 is implemented as two virtual cable modems 2061 and 2062 respectively for the IP data and the live TV services. The downstream channels working simultaneously that the cable modem supports are divided to 2 sets, with one channel set being used by cable modem 206 to work with CMTS 204 normally in the IP data plane 202, while the other channel set being used for receiving multicast IP packets of live TV from the CMTS 205 in the live TV plane 203. In this embodiment, the IP data plane 202 is bi-directional communication channel but the live TV plane 203 is only one-way downstream broadcasting channel.

It can be appreciated that cable modem 206 can exchange data with corresponding CPEs, for example, PC 207 and STB 208 in FIG. 2.

Figure 3:
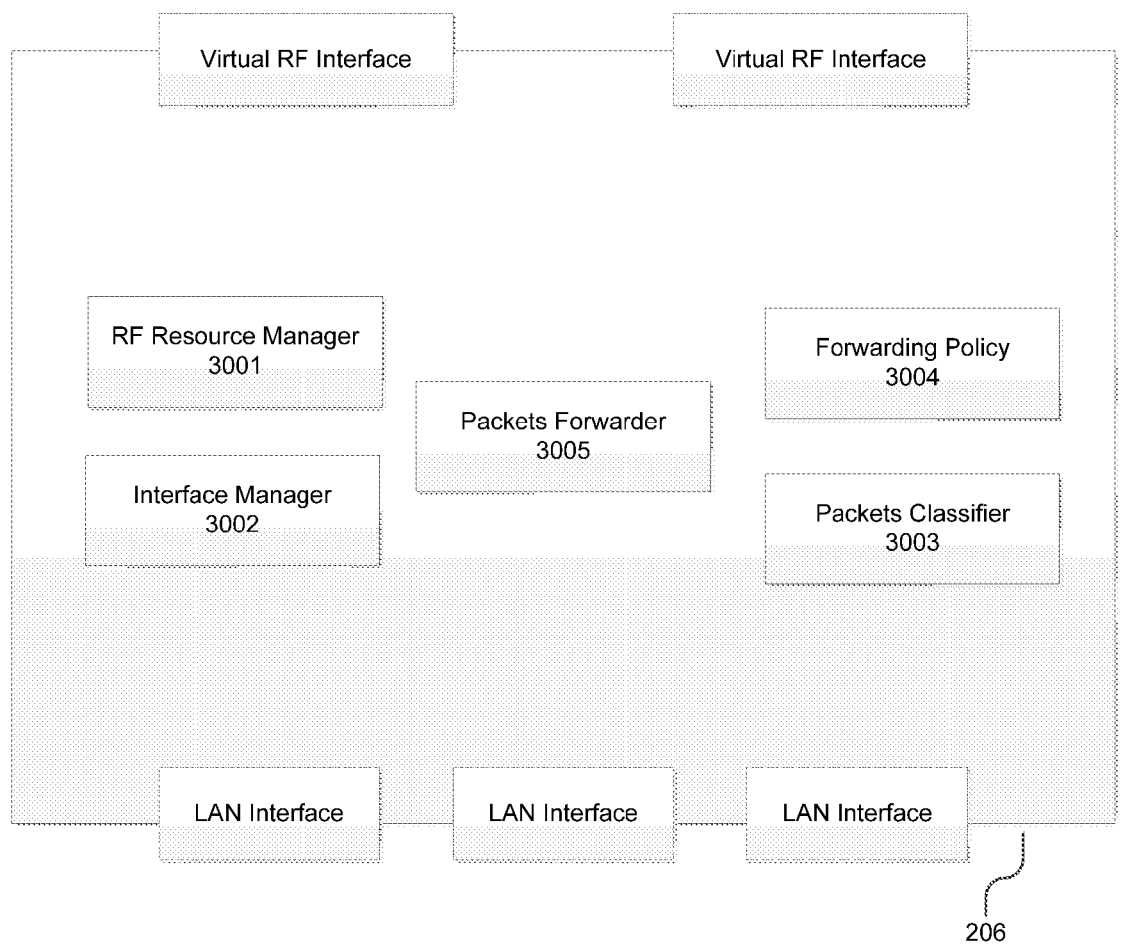
FIG. 3 is a block diagram showing the structure of cable modem according to an embodiment of the present invention.

FIG. 3 is a block diagram showing the structure of a cable modem for the implementation of live TV distribution in the network architecture shown in FIG. 2 according to an embodiment of the present invention.

As shown in FIG. 3, the cable modem 206 comprises a RF resource manager unit 3001 for managing RF resource allocation of the cable modem 206. Detailed process will be described later.

The cable modem 206 further comprises an interface manager unit 3002 for establishing multiple virtual RF interfaces with multiple CMTS according to the RF resource allocation of the RF resource manager 3001. The interface manager 3002 will manage all the LAN interfaces, RF interface as well as virtual interfaces. In this embodiment, two virtual RF interfaces are shown to be respectively for the CMTSs 204 and 205. The interface manager unit 3002 can also manage the LAN interfaces for CPE site (three LAN interfaces are shown in FIG. 3).

The cable modem 206 further comprises a packets classifier unit 3003 for classifying packets into different service flows towards different upstream CMTS.

The cable modem 206 maintains a forwarding policy 3004 which defines the packets forwarding rules between each interface.

The cable modem 206 further comprises a packets forwarder unit 3005 which is an engine to switch packets between multiple CMTSs and respective CPEs.

Next, the process of the RF resource manager unit 3001 to allocate RF resource to CMTS 204 and 205 will be described in details.

In this embodiment, suppose the RF resource manager unit 3001 of the cable modem 206 has full band capability to capture 8 downstream RF channels and 4 upstream channels at the same time and two virtual cable modems will be implemented in this physical cable modem 206. However, it can be appreciated that more channels and virtual cable modems is applicable within the band capability of the chip of the cable modem.

To complete Docsis communication, each virtual cable modem needs to have both upstream channels and downstream channels. The combination of upstream and downstream channels for each virtual cable modem can be defined as a "service channel group".

For example, service channel group A consists of upstream channel 1, 2 and downstream channel 1,2,3,4 and service channel group B consists of upstream channel 3, 4 and downstream channel 5,6,7,8.

In this embodiment, there are two CMTSs deployed in the same cable plant without overlapped upstream or downstream channel planning. Therefore, there is a need for the RF channel planning to avoid confliction. Any appropriate planning scheme can be used. No further details will be provided in this respect. The service channel group division can be statically hard copy in the physical cable modem 206 or dynamically decided by the physical cable modem 206 during operation phase.

In case of static configuration of service channel group division, the channels which can be used to work with one CMTS are restricted by the configuration. In dynamic case, the division can be very flexible. Anyway, the operation flow in physical cable modem 206 is almost same.

The following table shows the channel occupation of the CMTSs 204 and 205 in this embodiment.

TABLE 1

Channel occupation for CMTS

| channel id | frequency(MHz) | bandwidth(MHz) | CMTS id |
|---|---|---|---|
| 1 | 500 | 8 | 1 |
| 2 | 600 | 8 | 2 |
| 3 | | | |
| 4 | | | |

The RF resource manager unit 3001 of the cable modem 206 needs to maintain the above table both for upstream and downstream to balance the channel distribution for the two virtual cable modems. In case of static service channel group configuration, these tables are almost the same as the static configuration. While in case of dynamic service channel group situation, these tables need to be dynamically updated according to the channel sync status and the Dynamic Channel Change operation as well as the Dynamic Bonding Change operation.

After the cable modem 206 is power on, the RF resource manager unit 3001 starts to scan all downstream channels to synchronise with DOCSIS primary downstream channel with any CMTS by looking after SYNC, MAP and UCD (Uplink Channel Descriptor) messages. Once the primary downstream channel is locked for the first CMTS, for example, the CMTS 204, the cable modem 206 starts a normal Docsis MAC establishment with the CMTS 204, the available upstream and downstream channels are decided by the MAC messages from CMTS 204 and the local service channel group division restriction. Then the reserved channels for this CMTS are recorded in the above illustrated table.

After the RF resource manager unit 3001 complete the MAC establishment with the CMTS 204, it can be understood that the first virtual cable modem is created. Then the free upstream and downstream channels can be used to establish Docsis MAC connection with the second CMTS, which is the CMTS 205 in this case. The same normal Docsis MAC establishment operation runs between the CMTS 205 and the free channel resources. The channels used for the CMTS 205 are also updated in the above illustrated table.

In case of working channel changes for any of the CMTS 204 and 205 either by Dynamic Channel Change message or Dynamic Bonding Change message, the RF resource manager unit 3001 needs to make sure that there is no RF resource confliction for the CMTS according to the record table and update the table accordingly.

It should be noted that the data communication of the cable modem 206 with the first CMTS 204 and the corresponding CPEs is by conventional process, similar to the process described with reference to FIG. 1. No further details will be provided in this respect.

As described above, one physical cable modem 206 can establish two Docsis MAC connections with two CMTS 204 and 205. The cable modem 206 can decide which CPE will be served by which Docsis MAC connection. It can also take advantage of these 2 Docsis MAC connection to implement dynamic load balancing or backup link for CPEs.

Next, a process of live TV distribution in the network architecture shown in FIG. 2 will be described.

The following three tables will be used by the service platform 201, the CMTS 204, 204, the cable modem 206 and the IP mode STB 208.

TABLE 2

TV program address assignment

| multicast group address | program id | program name | authentication url |
|---|---|---|---|
| 239.1.1.1 | 1 | TV 1 | http://server/example1 |
| 239.1.1.2 | 2 | TV 2 | |
| 239.1.1.3 | 3 | TV 3 | |
| 239.1.1.4 | 4 | TV 4 | |

TABLE 3

Group-to-channel map

| multicast group address | RF channel |
|---|---|
| 239.1.1.1 | 1 |
| 239.1.1.2 | 1 |
| 239.1.1.3 | 2 |
| 239.1.1.4 | 2 |

TABLE 4

TV RF channel configuration

| RF channel | frequency | modulation profile | other RF parameters |
|---|---|---|---|
| 1 | | | |
| 2 | | | |
| 3 | | | |

Firstly, the service platform 201 will constantly multicast the live TV program in IP packets to the second CMTS 205.

Then the CMTS 205 will statically forward all the TV packets to all available downstream RF channels according to the configurations in tablet-3 and tablet-4.

During this process, the cable modem 206 will establish an IP connection with CMTS 204 as normally.

The IP mode STB 208 will get the EPG information and information on TV program address assignment from table-2 information after it establishes the IP connection with service platform 201.

When the STB 208 starts to render certain live TV program, it may use the authentication URL to communicate with the service platform 201 to check if it is authorized to watch the program. If for example DRM (Digital Rights Management) is used to protect the program, the STB 208 may use digital certificate or username/password account to handshake with the service platform 201. If it is authorized, then the proper decryption information is delivered to STB 208.

After the STB 208 passes the authentication, it will issue the IGMP (Internet Group Management Protocol) Join Report to notify the cable modem 206 of the multicast group address in which it is interested.

Then the cable modem 206 will tune to proper downstream RF channel to demodulate the IP multicast streams and filter out the desired stream with the corresponding multicast group address according to the table-3 and table-4.

Finally the STB 206 can receive the multicast IP stream from the cable modem 206 and start to render the stream to TV set (not shown) after appropriate DRM decryption, if needed.

It can be seen that during the above process the cable modem 206 is totally transparent to the bi-directional IP communication between the STB 208 and the service platform 201. This is mainly used for demodulating the live TV packets to take advantage of the fact the cable plant has plenty of RF channel resources. And thus the cable modem 206 can keep the whole Docsis IP channel bandwidth for end subscribers for high speed internet service and other services.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A cable modem for a network, comprising
   a radio frequency resource manager unit for allocating a radio frequency resource to a plurality of cable modem terminal systems; and
   an interface manager unit for establishing radio frequency interfaces respectively with the plurality of cable modem terminal systems according to the radio frequency resource allocation of the radio frequency resource manager unit; and
   wherein the cable modem transmits a table of the radio frequency resource allocation to the plurality of cable modem terminal s stems for notification of the radio frequency resource allocation.

2. The cable modem according to claim 1, wherein the cable modem classifies packets into respective service flows towards the plurality of cable modem terminal systems.

3. The cable modem according to claim 1, wherein the cable modem switches packets between the plurality of cable modem terminal systems and respective Customer Premise Equipments according to a forwarding policy.

4. The cable modem according to claim 1, wherein the plurality of cable modem terminal systems comprise a cable modem terminal system for IP data transmission and a cable modem terminal system for live TV signal transmission.

5. A network system, comprising
   a service platform for providing IP data and live TV services;
   a first cable modem terminal system for performing a communication of IP data with the service platform;
   a second cable modem terminal system for performing a communication of live TV signals with the service platform; and
   a cable modem for performing communications with the first cable modem terminal system and the second cable modem terminal system with allocated radio frequency resource and providing the IP data and live TV signals to respective Customer Premise Equipments, and wherein the cable modem transmits a table of the radio frequency resource allocation to the first and the second cable modem terminal s stems for notification of the radio frequency resource allocation.

6. The network system according to claim 5, wherein the first cable modem terminal system performs a bi-directional communication of IP data with the service platform.

7. The network system according to claim 5, wherein the second cable modem terminal system receives multicast live TV signals from the service platform.

8. The network system according to claim 5, wherein the service platform encodes the live TV signals into IP packets and transmits the IP packets to the second cable modem terminal system.

9. The network system according to claim 5, wherein the Customer Premise Equipment is a personal computer for IP data.

10. The network system according to claim 5, wherein the Customer Premise Equipment is a Set-Top-Box for live TV signals.

11. The network system according to claim 5, wherein the network system is a DOCSIS (Data Over Cable Service Interface Specification) based network.

\* \* \* \* \*

UNITED STATES PATENT AND TRADEMARK OFFICE
CERTIFICATE OF CORRECTION

| | |
|---|---|
| PATENT NO. | : 9,706,246 B2 |
| APPLICATION NO. | : 14/915461 |
| DATED | : July 11, 2017 |
| INVENTOR(S) | : Zujian Zhuang and Jinfei Yu |

It is certified that error appears in the above-identified patent and that said Letters Patent is hereby corrected as shown below:

In the Claims

In Column 8, Line 23, Claim 5, delete "s stems" and insert --systems--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*